(No Model.)
C. H. UHLER.
BLANK FOR CHECKS AND OTHER NEGOTIABLE PAPERS.
No. 286,159. Patented Oct. 2, 1883.
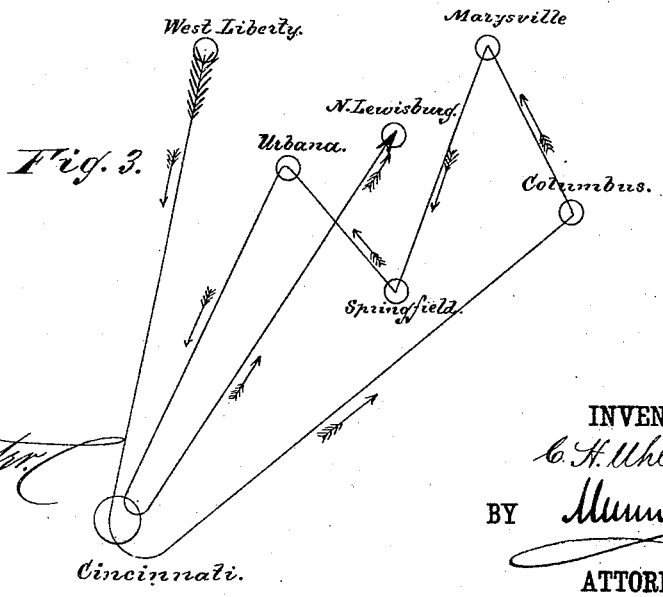

UNITED STATES PATENT OFFICE.

CLARENCE H. UHLER, OF LEBANON, PENNSYLVANIA, ASSIGNOR OF ONE-HALF TO J. CLEMENT UHLER, OF NEW YORK, N. Y.

BLANK FOR CHECKS AND OTHER NEGOTIABLE PAPERS.

SPECIFICATION forming part of Letters Patent No. 286,159, dated October 2, 1883.

Application filed January 11, 1883. (No model.)

*To all whom it may concern:*

Be it known that I, CLARENCE H. UHLER, of Lebanon, in the county of Lebanon and State of Pennsylvania, have invented a new and Improved Blank for Checks and other Negotiable Papers, of which the following is a full, clear, and exact description.

My invention relates to an improvement in bank-checks, drafts, notes, or other negotiable instruments, the object being to facilitate the collection of checks or other negotiable paper.

Heretofore it has been customary for a bank or banking-house that has a check on another bank to collect to send it for collection to a bank with which it is in communication, or in which it has a correspondent, and located in the place that is nearest the one in which the bank is located on which the check is drawn. If the bank in which the check is deposited for collection is in communication or corresponds with the bank on which the check is drawn, it sends the check direct to the same; but if it is not in communication or in correspondence with the same, it is forced to send the check to some other bank with which it is in communication, and which is also in communication with the bank on which the check is drawn. By this method of procedure it frequently happens that a check deposited for collection in a bank located only a short distance from the bank on which the check is drawn is obliged to travel a very great distance before it can be collected or paid. In order that the objectionable features of the ordinary system above referred to may be clearly understood, I will proceed to give an illustration of the unnecessary distance a check is sometimes obliged to travel before it can be collected; and to this end I refer the reader to the diagram illustrated by Figure 3 of the accompanying drawings, which is an actual case recently reported. Suppose a check drawn on a bank in N. Lewisburg is deposited for collection in a bank at West Liberty, and the latter bank is not in communication or in correspondence with the bank at N. Lewisburg. The West Liberty bank, under the circumstances, sends the check to its correspondent nearest to West Liberty, which happens to be a Cincinnati bank, expecting the same is in communication or correspondence with the N. Lewisburg bank. If this is not the case, the Cincinnati bank sends the check to its correspondent nearest to N. Lewisburg, which it presumes is in communication or correspondence with the N. Lewisburg bank. For example, it sends the check to a Columbus bank. The Columbus bank, not being in communication or in correspondence with the N. Lewisburg bank, sends it to Marysville. From there it goes to Springfield, and then to Urbana. The Urbana bank sends it to its correspondent in Cincinnati, which happens to be a different bank from the one through which the check had previously passed, and which happens, also, to be a correspondent of the N. Lewisburg bank, upon which the check is drawn. The Cincinnati bank then collects the check direct and in the usual manner, and pays the money to the Urbana bank, which in turn pays it to the Springfield bank, and so on in turn back to the starting-point at West Liberty. By the process described the check must often travel great distances, involving unnecessary expense and the loss of time. Should the check be protested at the N. Lewisburg bank for any reasons, the check must travel back over the exact route it took in reaching the N. Lewisburg bank from West Liberty until it again reaches West Liberty. Besides the delay and expense attending this method of collecting checks, there are other losses that make the system very objectionable in actual practice. For instance, at the time the check is issued at West Liberty the deposit in the N. Lewisburg bank may be perfectly safe and more than sufficient to cover the check; but during the time the check is traveling around from place to place the party having an account at the N. Lewisburg bank may have drawn so heavily on his account that the check, when received, must be refused or protested, and this would have been avoided had the check been promptly forwarded. Again, this method of collecting checks causes great complication and needless expense to the several banks.

The object of my invention is to obviate the objectionable features attending the collection of checks and other negotiable instruments, as has been described; and with this end in view the invention consists in a check, draft, note, or other negotiable instrument having printed or otherwise produced thereon the names of the correspondents of the bank through which said check or other instrument is collectible.

In the accompanying drawings, Fig. 1 is a face view of a check; and Fig. 2, a rear view of the same, showing one form of my improvement. Fig. 3 is a diagram illustrating the course of a check that is collected in the manner customary heretofore.

On the back or face of the check or other negotiable instrument are printed or otherwise produced the names of the correspondents of the bank through which the check is collectible, so that if any other bank or banking-house receives the check for collection it is enabled to immediately ascertain the different banks that are in communication or correspondence with the bank on which the check is drawn, and of the number of different banks noted on the check, the bank can forward it to the one that will insure the most prompt collection of the check. Resuming the illustration heretofore made, should the N. Lewisburg bank have its checks provided with the names of all the banks with which it is in communication or correspondence, the bank at West Liberty, at which the check is deposited for collection, could instantly ascertain the proper bank to which the check should be sent to insure prompt collection and settlement. For instance, if the N. Lewisburg bank should have the name of the First National Bank of Cincinnati specified among its list of correspondents, the West Liberty bank would only need to send the check to the First National Bank of Cincinnati, its own correspondent, for collection, and the First National Bank of Cincinnati could then send the check direct to N. Lewisburg, thus obviating the necessity for having the check travel over the tortuous route illustrated in the diagram Fig. 3, and hence avoiding the loss, delay, and risk attending the old method of collection.

The names of the correspondents of the banks can be printed in pale ink on the face or the back of the check; or they can be printed on one end of the check. If desired, the words "collectible without charge from the following banks" can also be printed on the check-blank. The names can be printed, lithographed, stamped, or otherwise produced in some suitable manner on the blank. In place of the names of banks, the names of banking-houses, commercial agencies, and other commercial establishments can be produced on the checks, and the blanks can be used for checks, drafts, notes, or other negotiable paper.

Having fully described my invention, what I claim as new, and desire to secure by Letters Patent, is—

A check, draft, note, or other negotiable instrument having printed thereon the names of the correspondents of the bank through which said check or instrument is collectible, substantially as set forth.

CLARENCE H. UHLER.

Witnesses:
ADAM FUNCK,
A. J. MEREDITH.